(12) United States Patent
Nakanishi et al.

(10) Patent No.: US 11,333,266 B2
(45) Date of Patent: May 17, 2022

(54) ELECTROMAGNETIC VALVE (71) Applicant: NIDEC TOSOK CORPORATION, Kanagawa (JP)

(72) Inventors: Tomohiko Nakanishi, Kanagawa (JP); Takashi Takai, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 17/017,703

(22) Filed: Sep. 11, 2020

(65) Prior Publication Data
US 2021/0095781 A1   Apr. 1, 2021

(30) Foreign Application Priority Data

Sep. 26, 2019 (JP) .............................. JP2019-175748

(51) Int. Cl.
*F16K 31/06* (2006.01)
*F16K 27/04* (2006.01)

(52) U.S. Cl.
CPC ........ *F16K 31/0675* (2013.01); *F16K 27/048* (2013.01); *F16K 31/0613* (2013.01)

(58) Field of Classification Search
CPC .. F16K 27/029; F16K 27/048; F16K 31/0613; F16K 31/0655; F16K 31/0675
USPC .............................. 251/129.02, 129.15, 358
See application file for complete search history.

(56) References Cited

U.S. PATENT DOCUMENTS

| 2,826,215 | A | * | 3/1958 | Wolfslau | ............. | F16K 31/0689 |
| | | | | | | 137/454.6 |
| 5,076,538 | A | * | 12/1991 | Mohr | .................... | B60T 15/028 |
| | | | | | | 251/129.18 |
| 6,345,870 | B1 | * | 2/2002 | Linkner, Jr. | ............ | B60T 8/367 |
| | | | | | | 251/129.02 |
| 6,453,930 | B1 | * | 9/2002 | Linkner, Jr. | ............ | B60T 8/363 |
| | | | | | | 137/15.18 |
| 7,575,218 | B2 | * | 8/2009 | Speer | .................. | F16K 31/0655 |
| | | | | | | 251/129.02 |
| 7,832,707 | B2 | * | 11/2010 | Shigeta | ............... | F16K 31/0675 |
| | | | | | | 251/129.02 |
| 7,871,056 | B2 | * | 1/2011 | Kratzer | ................... | B60T 8/363 |
| | | | | | | 251/129.02 |
| 8,186,370 | B2 | * | 5/2012 | Cloud | ................. | F16K 31/0658 |
| | | | | | | 137/15.18 |
| 2019/0376611 | A1 | | 12/2019 | Ichiyama et al. | | |

FOREIGN PATENT DOCUMENTS

JP          2018179019          11/2018

* cited by examiner

*Primary Examiner* — Matthew W Jellett
(74) *Attorney, Agent, or Firm* — JCIPRNET (57) ABSTRACT

An electromagnetic valve includes: a solenoid, including a bobbin, a plunger, and a coil that moves the plunger; and a valve mechanism, including a flow path member that includes a first flow path, a second flow path, a relay part and a valve body housing, and a valve body that is inserted into the valve body housing, movably supported along an axial direction together with the plunger, and switches between passage and blockage between the first and the second flow paths. The valve body includes: a protrusion provided protruding radially outward from an outer periphery of the valve body and guided by an inner wall surface of the valve body housing when the valve body moves; a body made of resin; and a pin made of metal, provided at a center of the body along the axial direction and penetrating the body.

8 Claims, 4 Drawing Sheets

ELECTROMAGNETIC VALVE

CROSS REFERENCE TO RELATED APPLICATIONS

The present invention claims priority under 35 U.S.C. § 119 to Japanese Application No. 2019-175748 filed on Sep. 26, 2019, the entire content of which is incorporated herein by reference.

FIELD OF THE INVENTION

The disclosure relates to an electromagnetic valve.

BACKGROUND

Conventionally, there has been known an electromagnetic valve that switches between passage and blockage of gas. The above electromagnetic valve includes a fixed core, a movable core capable of approaching the fixed core under the action of an electromagnetic force, and a gas flow path formation member including a gas introduction hole and a gas discharge hole. A tubular part guiding the movable core is fixed to the fixed core. A valve body is attached to an end of the movable core opposite the fixed core. As the movable core moves, the valve body opens the gas introduction hole and allows gas to pass from the gas introduction hole to the gas discharge hole; conversely, the valve body is able to close the gas introduction hole and stop the passage of the gas.

Generally, the valve body (movable core) is often composed of a block body made of metal, and there is room for further improvement to realize more stable movement of the valve body.

SUMMARY

An exemplary embodiment of the disclosure provides an electromagnetic valve, including a solenoid and a valve mechanism. The solenoid includes a bobbin of a tubular shape including a through hole penetrating along an axial direction, a plunger inserted into the through hole and movably supported along the axial direction, and a coil wound around an outer periphery of the bobbin, generating a magnetic force when energized, and moving the plunger. The valve mechanism includes a flow path member connected to the solenoid and a valve body of a columnar shape. The flow path member includes a first flow path, a second flow path, a relay part connecting the first flow path and the second flow path, and a valve body housing disposed adjacent to the relay part and along the axial direction. The valve body is inserted into the valve body housing, movably supported along the axial direction together with the plunger, and switches between passage and blockage of a fluid via the relay part between the first flow path and the second flow path. The valve body includes: a protrusion provided protruding radially outward from an outer periphery of the valve body and guided by an inner wall surface of the valve body housing when the valve body moves; a body made of resin; and a pin made of metal, provided at a center of the body along the axial direction and penetrating the body.

The above and other elements, features, steps, characteristics and advantages of the present disclosure will become more apparent from the following detailed description of the preferred embodiments with reference to the attached drawings.

DETAILED DESCRIPTION

Hereinafter, an electromagnetic valve of the disclosure will be described in detail based on exemplary embodiments shown in the accompanying drawings.

Hereinafter, an exemplary embodiment of an electromagnetic valve of the disclosure will be described with reference to FIG. 1 to FIG. 4. In the following, for convenience of description, three axes orthogonal to each other are set as an X axis, a Y axis, and a Z axis. As an example, an XY plane including the X axis and the Y axis is horizontal, and the Z axis is vertical. In the present embodiment, a first axis O1 is parallel to the X axis, and a second axis O2 and a third axis O3 are parallel to the Z axis. A direction parallel to the X axis may be referred to as "axial direction (first axis O1 direction)," a radial direction about this axis may be simply referred to as "radial direction," and a circumferential direction about the aforesaid axis may be simply referred to as "circumferential direction." A positive side in the X axis direction may be referred to as "one side in the axial direction (one end side of the first axis O1)" or simply "one side," and a negative side in the X axis direction may be referred to as "the other side in the axial direction (the other end side of the first axis O1)" or simply "the other side." In this specification, vertical direction, horizontal direction, upper side and lower side are simply names for describing relative positional relationships between each part, and the actual arrangement relationships may be arrangement relationships other than those indicated by these names.

Figure 1:
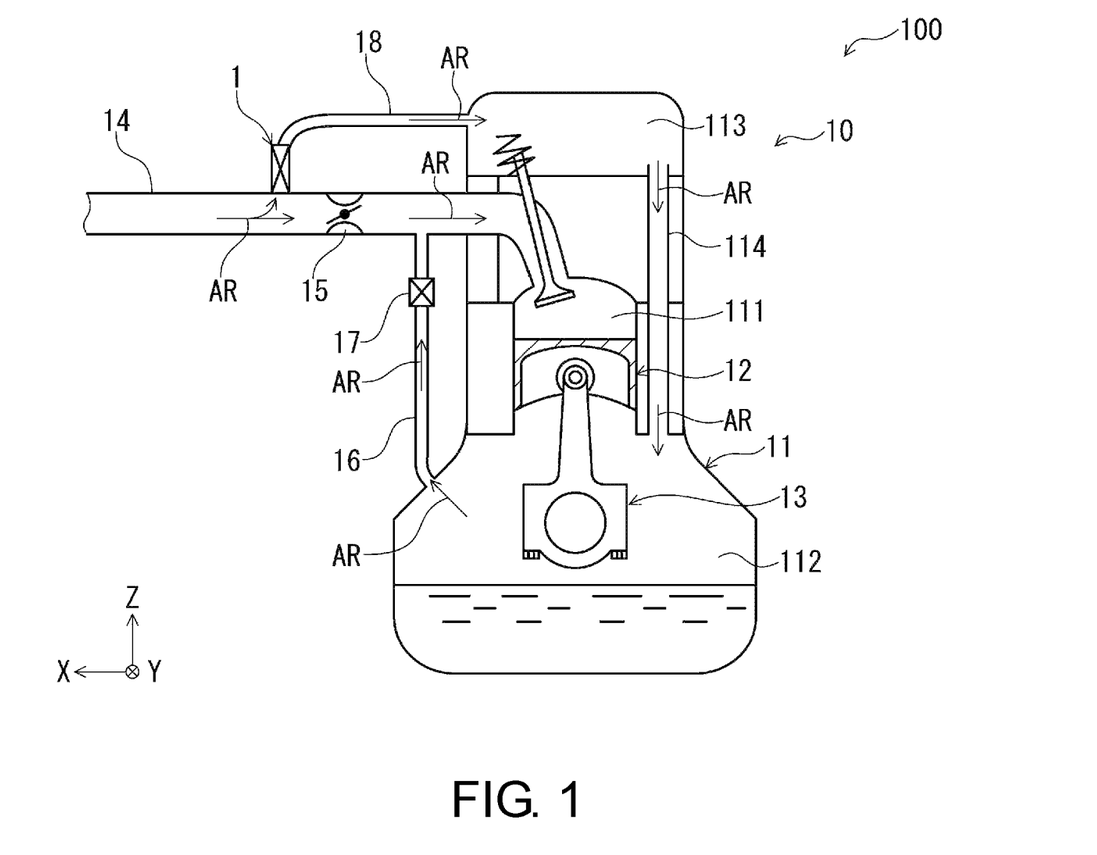
FIG. 1 is a view showing an example of a use state of an electromagnetic valve (open state) of the disclosure.
Figure 2:
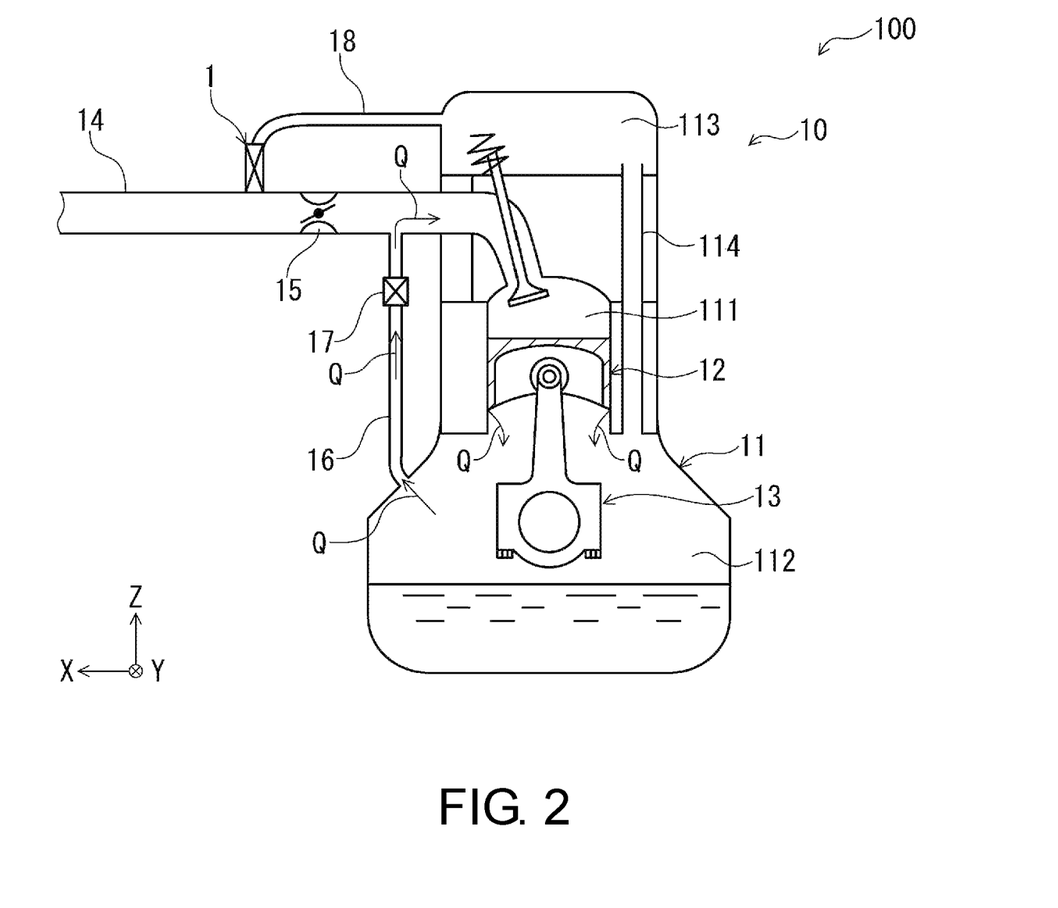
FIG. 2 is a view showing an example of a use state of an electromagnetic valve (closed state) of the disclosure.

As shown in FIG. 1 and FIG. 2, an electromagnetic valve 1 is, for example, mounted on a vehicle 100 including an internal combustion engine 10 such as an engine or the like for use. The internal combustion engine 10 includes: a housing 11 including a combustion chamber 111, a crank chamber 112 and a buffer chamber 113; a piston 12 movably provided in the combustion chamber 111; and a crank 13 provided in the crank chamber 112 and converting a reciprocating movement of the piston 12 into a rotational movement.

In the housing 11, the crank chamber 112 and the buffer chamber 113 are connected via an internal flow path 114.

An external flow path 14 is connected to the combustion chamber 111 from the outside of the housing 11. An electromagnetic valve 15, which is a throttle valve, is disposed in the middle of the external flow path 14.

A downstream side of the electromagnetic valve 15 in the external flow path 14 and the crank chamber 112 are connected via a first auxiliary flow path 16. An electromagnetic valve 17, which is a positive crankcase ventilation (PCV) valve, is disposed in the middle of the first auxiliary flow path 16.

An upstream side of the electromagnetic valve 15 in the external flow path 14 and the buffer chamber 113 are connected via a second auxiliary flow path 18. The electromagnetic valve 1 of the disclosure is disposed in the second auxiliary flow path 18 at a boundary with the external flow path 14. The electromagnetic valve 1 is a valve that switches between opening and closing the external flow path 14. The electromagnetic valve 1 changes the external flow path 14 into an open state (see FIG. 1) during normal traveling of the vehicle 100, and changes the external flow path 14 into a closed state (see FIG. 2) during leak detection in which a leakage of an air-fuel mixture AR or the like (hereinafter simply referred to as "leakage") is detected.

As shown in FIG. 1, in the open state, the air-fuel mixture AR passes through the external flow path 14, flows into the combustion chamber 111, and is used for combustion. Accordingly, the piston 12 is able to move. In addition, a portion of the air-fuel mixture AR passing through the external flow path 14 flows into the second auxiliary flow path 18 from the middle of the external flow path 14, through the buffer chamber 113 and the internal flow path 114 in sequence, and reaches the crank chamber 112. The air-fuel mixture AR that has flowed into the crank chamber 112 is able to return to the external flow path 14 through the first auxiliary flow path 16.

As shown in FIG. 2, in the closed state, the supply of the air-fuel mixture AR to the internal combustion engine 10 is stopped. Then, when the pressure in the combustion chamber 111 becomes high due to combustion, a portion of a blow-by gas Q in the combustion chamber 111 flows over the piston 12 into the crank chamber 112. After that, the blow-by gas Q in the crank chamber 112 flows into the external flow path 14 through the first auxiliary flow path 16. At this time, if no leakage occurs, the pressure in the crank chamber 112 will decrease with time. When the pressure in the crank chamber 112 is below a threshold value, it is determined that no leakage has occurred. On the other hand, if a leakage has occurred, the pressure in the crank chamber 112 does not decrease and does not fall below the threshold value, or the pressure decrease tendency becomes slow, and it takes time for the pressure to fall below the threshold value. In this case, it is determined that a leakage has occurred.

Figure 3:
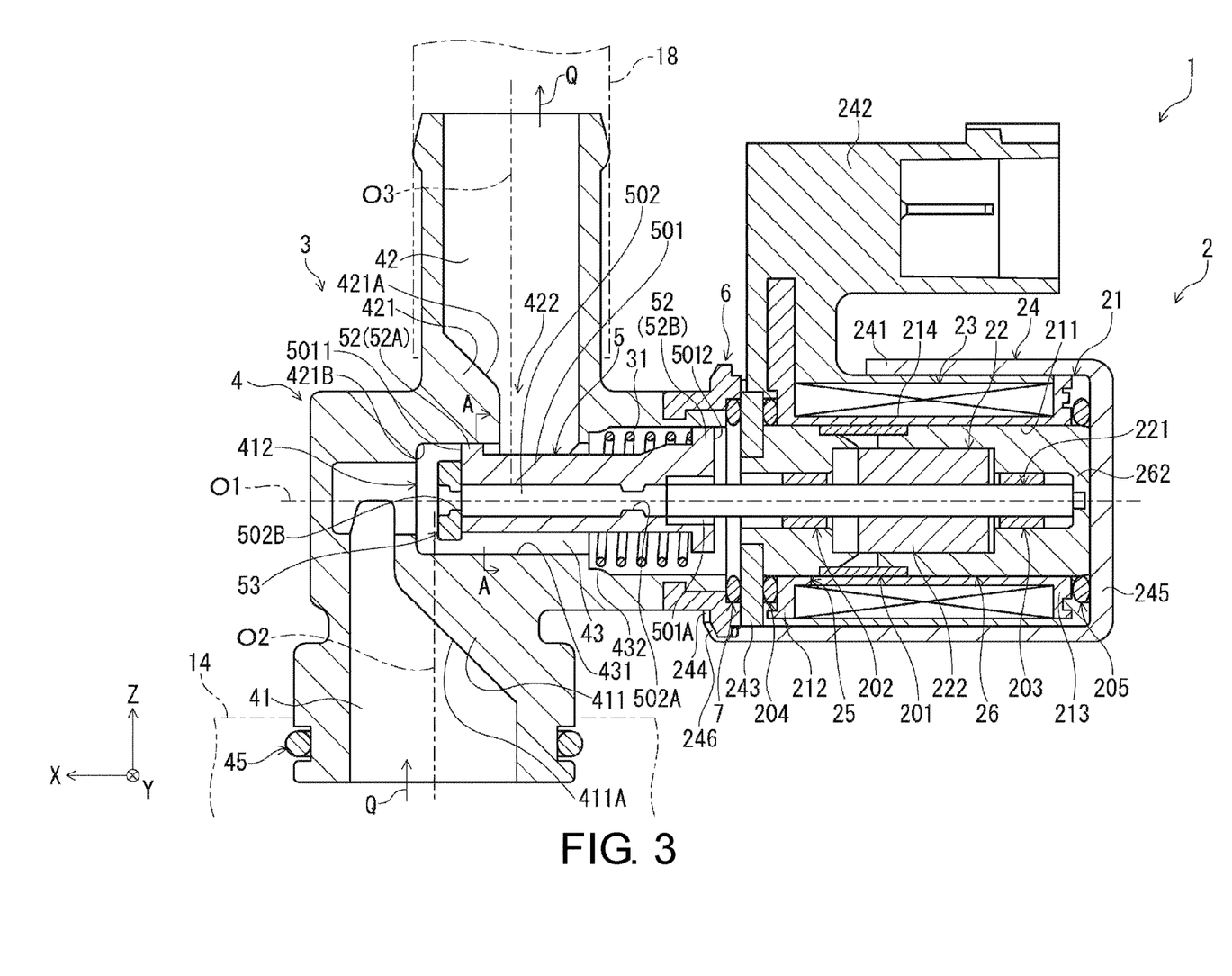
FIG. 3 is a sectional view showing an embodiment of an electromagnetic valve of the disclosure.

As shown in FIG. 3, the electromagnetic valve 1 includes a solenoid 2 disposed on the negative side in the X axis direction and a valve mechanism 3 disposed on the positive side in the X axis direction. Hereinafter, configurations of each part will be described.

The solenoid 2 includes a bobbin 21, a plunger 22, a coil 23, a case 24, a core 25, and a yoke 26.

The bobbin 21 is a tubular or substantially tubular member including a through hole 211. The through hole 211 penetrates along the axial direction parallel to the X axis direction. An inner diameter of the through hole 211 is constant along the axial direction. The bobbin 21 includes a flange 212 protruding in the radial direction on one side, and a flange 213 protruding in the radial direction on the other side. The bobbin 21 is made of, for example, various resin materials such as polyester resin or polyimide resin or the like.

The coil 23 having conductivity is wound around an outer periphery 214 of the bobbin 21. By energizing the coil 23, that is, with energization of the coil 23, a magnetic circuit is defined by the bobbin 21, the core 25 and the yoke 26, and a magnetic force is able to be generated. Accordingly, the plunger 22 is able to be moved along the axial direction.

The core 25 and the yoke 26 are inserted into the through hole 211 of the bobbin 21, and the plunger 22 is inserted further inside.

The core 25 is disposed on the one side in the axial direction, and the yoke 26 is disposed on the other side in the axial direction.

The core 25 has a circular cylindrical or substantially circular cylindrical shape as a whole, and is disposed parallel to the X axis direction. The yoke 26 also has a circular cylindrical or substantially circular cylindrical shape as a whole, and is disposed parallel to the X axis direction. The core 25 and the yoke 26 include a soft magnetic material such as iron, that is, they are made of a soft magnetic metal material. Accordingly, a magnetic circuit is able to be generated that is able to sufficiently move the plunger 22.

In addition, the solenoid 2 includes in the through hole 211 a connecting member 201 connecting the core 25 and the yoke 26 while keeping the core 25 and the yoke 26 apart. The connecting member 201 has a circular cylindrical or substantially circular cylindrical shape, and the other end of the core 25 and one end of the yoke 26 are fitted inside the connecting member 201. The connecting member 201 is made of a nonmagnetic and rust-resistant metal material such as austenitic stainless steel or the like.

The plunger 22 is disposed across the core 25 and the yoke 26 and is supported to be movable alternately between the one side and the other side along the axial direction, that is, the plunger 22 is reciprocatably supported.

The plunger 22 includes a plunger body 222 of a circular cylindrical or substantially circular cylindrical shape, and a plunger pin 221 inserted into the plunger body 222. The plunger pin 221 protrudes on both of the one side and the other side in the axial direction. In addition, the other side of the yoke 26 is closed by a wall 262. By contact (that is, collision) of the plunger pin 221 with the wall 262, a movement limit of the plunger 22 to the other side is controlled.

In addition, in the plunger 22, the plunger pin 221 is supported by a bush 202 in the core 25, and the plunger pin 221 is supported by a bush 203 in the yoke 26. Accordingly, the plunger 22 is able to smoothly reciprocate.

The case 24 houses the bobbin 21, the plunger 22, the coil 23, the core 25, and the yoke 26. The case 24 includes a case body 241, a connector member 242, and a ring member 243.

The case body 241 has a tubular or substantially tubular shape with a bottom. That is, the case body 241 is a tubular or substantially tubular member including an opening 244 open on the one side in the axial direction and a wall 245 closing the other side. The yoke 26 contacts the wall 245 from the one side.

The ring member 243 has an annular or substantially annular shape and is disposed radially outside and concentrically with the core 25. The ring member 243 contacts the core 25 from the one side.

Like the core 25, the case body 241 and the ring member 243 are made of a soft magnetic metal material such as iron.

The connector member 242 is connected to a connector (not shown) that energizes the coil 23. Like the bobbin 21, the connector member 242 is made of, for example, a resin material.

In addition, the solenoid 2 includes in the case 24 a gasket 204 disposed between the ring member 243 and the flange 212 of the bobbin 21, and a gasket 205 disposed between the wall 245 of the case body 241 and the flange 213 of the bobbin 21.

The gasket 204 has a ring shape or substantially ring shape and is disposed on the outer peripheral side of and concentrically with the core 25. The gasket 204 is in a compressed state between the ring member 243 and the flange 212 of the bobbin 21, and accordingly, a gap between the ring member 243 and the flange 212 is able to be sealed.

The gasket 205 has a ring shape or substantially ring shape and is disposed radially outside and concentrically with the yoke 26. The gasket 205 is in a compressed state between the wall 245 of the case body 241 and the flange 213 of the bobbin 21, and accordingly, a gap between the wall 245 and the flange 213 is able to be sealed.

Moreover, the gasket 204 and the gasket 205 are made of an elastic material. The elastic material is not particularly limited, and examples thereof include various rubber materials such as urethane rubber, silicone rubber or the like.

The valve mechanism 3 includes a flow path member 4, a valve body 5, a connecting member 6, and a gasket 7.

The flow path member 4 is a member connected to the solenoid 2 via the connecting member 6 and is used as a switching valve that switches between passage and blockage of the blow-by gas Q being a fluid.

The flow path member 4 includes therein a first flow path 41, a second flow path 42, and a valve body housing 43.

The valve body housing 43 is provided along the X axis direction (axial direction) and houses the valve body 5 movably along the X axis direction. A sectional shape (that is, cross-sectional shape) of the valve body housing 43 in a direction orthogonal to the X axis direction of the valve body housing 43 is circular or substantially circular, and an inner diameter of the valve body housing 43 is approximately constant along the X axis direction.

The first flow path 41 has the second axis O2 as a central axis along the Z axis direction. The first flow path 41 includes a first port 412 opening to the valve body housing 43 toward the negative side in the X axis direction. An inner diameter of the first port 412 is smaller than an inner diameter of the valve body housing 43. On the other hand, the first flow path 41 opens to the outside toward the negative side in the Z axis direction on the side opposite the first port 412. In addition, the first flow path 41 side is connected to, for example, a pipe defining the external flow path 14 to which the electromagnetic valve 1 is fixed, and is connected to the combustion chamber 111 via the external flow path 14. In addition, a gasket 45 sealing a gap between the flow path member 4 and the pipe defining the external flow path 14 is fitted to the flow path member 4 from the outside.

The second flow path 42 has the third axis O3 as a central axis along the Z axis direction. The second flow path 42 includes a second port 422 opening to the valve body housing 43 toward the negative side in the Z axis direction. On the other hand, the second flow path 42 opens to the outside toward the positive side in the Z axis direction on the side opposite the second port 422. The second port 422 of the second flow path 42 is located closer to the negative side in the X axis direction (the other side in the axial direction) than the first port 412 of the first flow path 41. In addition, the second flow path 42 is connected to a pipe defining the second auxiliary flow path 18.

By such a configuration, the first flow path 41 and the second flow path 42 are connected via the valve body housing 43. By opening and closing the first port 412, the valve body 5 housed in the valve body housing 43 is able to switch between passage and blockage of the blow-by gas Q between the first port 412 (first flow path 41) and the second port 422 (second flow path 42). For example, in the case where an internal combustion engine equipped with the electromagnetic valve 1 is a naturally aspirated engine, as shown in FIG. 1, the blow-by gas Q flows from the first flow path 41, through the first port 412 and the second port 422 and toward the second flow path 42.

In the present embodiment, the flow path member 4 like this is made of, for example, a hard resin material such as polyphenylene sulfide (PPS) resin, acrylonitrile styrene (AS) resin, or acrylonitrile butadiene styrene (ABS) resin. That is, the flow path member 4 is made of resin. Accordingly, the flow path member 4 is able to be reduced in weight.

The flow path member 4 includes, in a wall defining the first flow path 41, a first thick part 411 where the thickness of the wall on the other side (right side in FIG. 3) in the axial direction increases toward the valve body housing 43. An upper surface (surface on the valve body 5 side) of the first thick part 411 defines a portion of an inner wall surface 431 of the valve body housing 43. In addition, a lower surface (surface opposite the valve body 5) of the first thick part 411 defines an inclined plane 411A inclined with respect to the second axis O2. That is, the thickness (length along the axial direction) of the first thick part 411 gradually increases toward the valve body housing 43. By such a configuration, turbulent flow is less likely to occur in the first flow path 41, and the blow-by gas Q is able to be prevented or suppressed from staying.

In addition, the flow path member 4 includes, in a wall defining the second flow path 42, a second thick part 421 where the thickness of the wall on the one side (left side in FIG. 3) in the axial direction increases toward the valve body housing 43. A lower surface (surface on the valve body 5 side) 421B of the second thick part 421 defines a portion of the inner wall surface 431 of the valve body housing 43. In addition, an upper surface (surface opposite the valve body 5) of the second thick part 421 defines an inclined plane 421A inclined with respect to the third axis O3. That is, the thickness (length along the axial direction) of the second thick part 421 gradually increases toward the valve body housing 43. By such a configuration, turbulent flow is less likely to occur in the second flow path 42, and the blow-by gas Q is able to be prevented or suppressed from staying.

The first thick part 411 and the second thick part 421 partially overlap each other in the axial direction. By such a configuration, the second axis O2 of the first flow path 41 and the third axis O3 of the second flow path 42 are able to approach each other. That is, the length of the flow path member 4 in the axial direction is able to be shortened. As a result, the electromagnetic valve 1 is able to be reduced in size.

The first port 412 is located closer to one end side in the axial direction than the second axis O2 of the first flow path 41. Accordingly, while the length of the flow path member 4 in the axial direction is shortened, sufficient length of the lower surface 421B of the second thick part 421 in the axial direction is able to be secured. The effect thereof will be described in detail later.

In addition, the valve mechanism 3 includes a coil spring 31 housed in the valve body housing 43 together with the valve body 5. The coil spring 31 is provided on the negative side in the X axis direction, that is, the other side in the axial direction, with respect to the valve body 5. In addition, the coil spring 31 is in a compressed state between a step part 432 provided in the middle of the valve body housing 43 in the axial direction and an end (later-described second protrusion 52B) of the valve body 5 on the other end side in the axial direction. Accordingly, a pushing force pushing the valve body 5 toward the negative side in the X axis direction, that is, the other side in the axial direction, is able to be applied to the valve body 5. Due to this pushing force, the valve body 5 is able to be separated from the first port 412, and therefore, the first port 412 is able to be opened. Moreover, it is possible to close the first port 412 by the following way: when the plunger 22 moves toward the positive side in the X axis direction against the pushing force of the coil spring 31, the valve body 5 approaches and blocks the first port 412.

The connecting member 6 has a ring shape or substantially ring shape and is fixed to the flow path member 4 radially outside the valve body housing 43. A bent part 246 defined by bending the opening 244 side of the case 24 radially inward is hooked to the connecting member 6, that is, the opening 244 side of the case 24 is crimped. By the crimping, the connecting member 6 is connected to the case 24, and therefore, a positional relationship between the valve mechanism 3 and the solenoid 2 is controlled. Accordingly, power from the solenoid 2, that is, force of the plunger 22, is able to be transmitted to the valve body 5 of the valve mechanism 3, and therefore, the valve body 5 is able to be moved. Like the connecting member 201, the connecting member 6 is made of, for example, a nonmagnetic and rust-resistant metal material.

The gasket 7 is disposed between the connecting member 6 and the ring member 243. The gasket 7 has a ring shape or substantially ring shape and is provided concentrically with the valve body housing 43. The gasket 7 is in a compressed state between the connecting member 6 and the ring member 243, and accordingly, a gap between the connecting member 6 and the ring member 243 is able to be sealed. Moreover, like the gasket 204, the gasket 7 is made of, for example, an elastic material such as urethane rubber or the like.

The valve body 5 having a columnar or substantially columnar shape is inserted into the valve body housing 43 of the flow path member 4. The valve body 5 is supported to be movable (reciprocatable) to the one side and the other side along the axial direction together with the plunger 22. By movement of the valve body 5, the first port 412 is able to be opened and closed as described above. Accordingly, between the first flow path 41 and the second flow path 42, switching between passage and blockage of the blow-by gas Q via the first port 412, the valve body housing 43 and the second port 422 is enabled.

The valve body 5 includes: a body 501 made of resin and having a circular cylindrical or substantially circular cylindrical shape; and a pin 502 made of metal, provided at a center of the body 501 along the axial direction and penetrating the body 501.

Since the body 501 is made of resin, the weight of the valve body 5 as a whole is able to be reduced, and the valve body 5 is able to move more smoothly. As a constituent material of the body 501, the same hard resin materials as those mentioned in the flow path member 4 may be used.

In addition to the body 501, if the flow path member 4 is made of resin, the weight of the valve mechanism 3 as a whole is able to be reduced, which is preferable.

The body 501 includes a recess 501A provided on a surface 5012 on the other side in the axial direction and recessed toward the one side in the axial direction. By providing the recess 501A, the weight of the body 501 (valve body 5) is able to be further reduced. In addition, it becomes easy to assemble the valve body 5 with the plunger 22 regardless of the shape of an end of the plunger pin 221 on the one end side in the axial direction. That is, various commercially available solenoids may be used, and therefore, the manufacturing cost of the electromagnetic valve 1 is able to be reduced.

On a bottom surface of the recess 501A, an end surface of the pin 502 on the other side in the axial direction is exposed. In the present embodiment, the end of the plunger pin 221 on the one end side in the axial direction is located in the recess 501A, and the end surface of the pin 502 on the other side in the axial direction and an end surface of the plunger pin 221 on the one side in the axial direction are in contact with each other. Accordingly, by the plunger 22, the valve body 5 is able to be more reliably pushed toward the one side in the axial direction. In this case, it is preferable that the plunger pin 221 be also made of metal. By direct contact of the pin 502 made of metal with the plunger pin 221 made of metal, a pressing force from the solenoid 2 is able to be reliably transmitted to the valve body 5.

Moreover, various metal materials such as aluminum and aluminum alloy may be used as a material forming the pin 502 and the plunger pin 221.

The pin 502 includes a first diameter-reduced part 502A and a second diameter-reduced part 502B where an outer diameter of the pin 502 is reduced. Among them, the first diameter-reduced part 502A is located on the other side in the axial direction of the pin 502, and the second diameter-reduced part 502B is located on the one side in the axial direction of the pin 502.

The first diameter-reduced part 502A is located in the body 501, and contacts the body 501 to restrict movement of the body 501 in the axial direction with respect to the pin 502. By such a simple configuration, the body 501 is able to be prevented from falling off the pin 502.

On the other hand, from a surface 5011 of the body 501 on the one side in the axial direction, the second diameter-reduced part 502B protrudes on the one side in the axial direction from the body 501.

A valve part 53 of a ring shape or substantially ring shape and having elasticity is provided in contact with the second diameter-reduced part 502B protruding from the body 501. That is, the valve body 5 further includes the valve part (seal part) 53 mounted on the positive side in the X axis direction of the pin 502.

The valve part 53 is able to contact a peripheral edge of the first port 412 when the valve body 5 closes the first port 412. Accordingly, the first port 412 is sufficiently closed, and therefore, the blow-by gas Q is more reliably blocked. That is, in the closed state of the first port 412, the peripheral edge of the first port 412 functions as a valve seat contacted by the valve part 53 (valve body 5). Therefore, in the present embodiment, a region including the valve seat and the first port 412 defines a relay part connecting the first flow path 41 and the second flow path 42.

Moreover, like the gasket 204, the valve part 53 is made of, for example, an elastic material such as urethane rubber or the like.

The body 501 and the pin 502 may be an assembly formed by outsert molding, but are preferably integrally formed by insert molding. According to the insert molding, the body 501 and the pin 502 are able to be more firmly fixed.

As shown in FIG. 3, the valve body 5 (body 501) includes a plurality of protrusions 52. The plurality of protrusions 52 are each provided protruding radially outward from an outer periphery 51 of the valve body 5.

Figure 4:
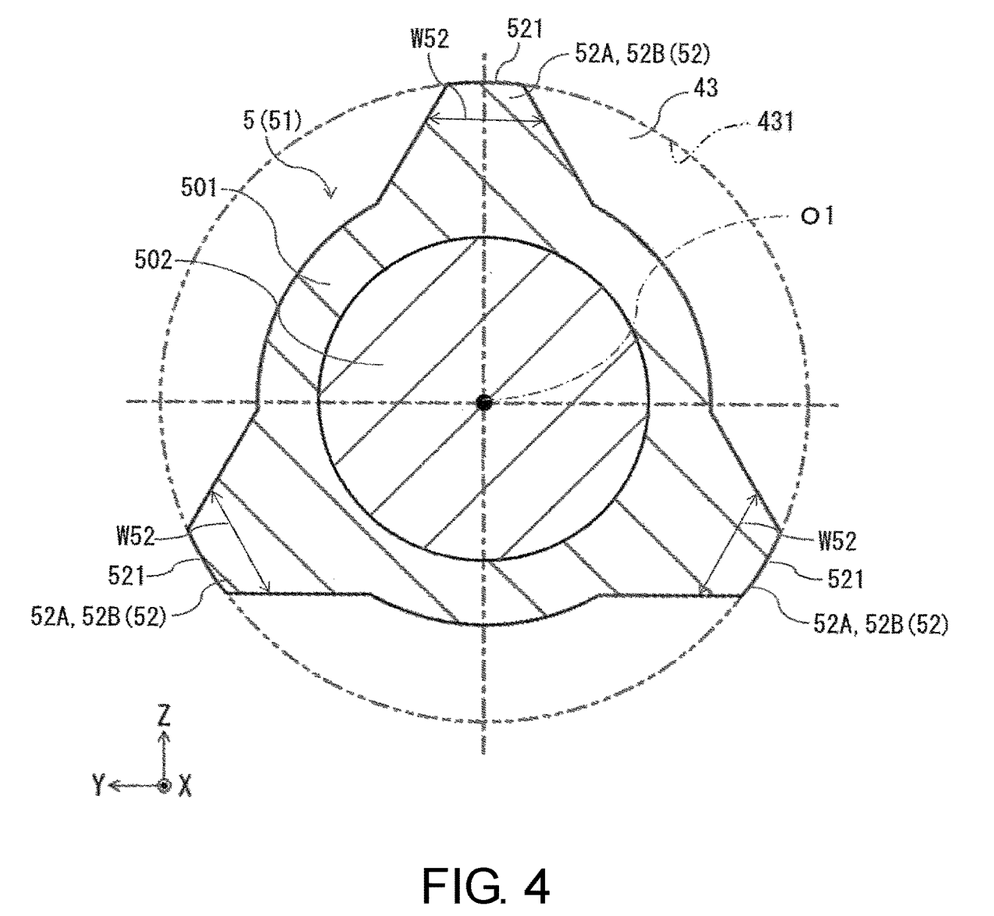
FIG. 4 is a sectional view taken on line A-A in FIG. 3.

In addition, among the plurality of protrusions 52, the protrusion 52 located at an end on the one side in the axial direction is referred to as "first protrusion 52A," and the protrusion 52 located at an end on the other side in the axial direction is referred to as "second protrusion 52B." As shown in FIG. 4, three first protrusions 52A are provided at equal intervals along the circumferential direction of the valve body 5, and three second protrusions 52B are also provided at equal intervals along the circumferential direction of the valve body 5. There are respectively three first protrusions 52A and three second protrusions 52B provided along the circumferential direction of the valve body 5. However, the disclosure is not limited thereto, and there may be four or more first protrusions 52A and four or more second protrusions 52B provided along the circumferential direction of the valve body 5. In addition, the number of the first protrusions 52A disposed is the same as the number of the second protrusions 52B disposed. However, the disclosure is not limited thereto, and the number of the first protrusions 52A disposed may be different from the number of the second protrusions 52B disposed.

As shown in FIG. 4, a top 521 located radially outermost in each protrusion 52 contacts and is guided by the inner wall surface 431 of the valve body housing 43 when the valve body 5 moves. Accordingly, sliding area (contact area) of the valve body 5 with the inner wall surface 431 is able to be reduced as much as possible, and accordingly, sliding resistance is able to be reduced as much as possible. As a result, it is possible for the valve body 5 to stably slide, that is, slidability of the valve body 5 is improved. In addition, even if the blow-by gas Q contains foreign matter, due to the small area of the top 521 of each protrusion 52, attachment of the foreign matter (deposits) to the top 521 is able to be suppressed or prevented. Accordingly, it is possible to prevent movement of the valve body 5 from being hindered by the foreign matter (deposits), and therefore, the slidability of the valve body 5 is further improved.

As shown in FIG. 3, each second protrusion 52B functions as a spring seat contacted by an end of the coil spring 31 on the other side in the axial direction, and the step part 432 of the valve body housing 43 functions as a spring seat contacted by an end of the coil spring 31 on the one side in the axial direction. Accordingly, separate provision of the spring seat is able to be omitted, and therefore, the electromagnetic valve 1 is able to have a simple configuration.

As described above, three first protrusions 52A and three second protrusions 52B are respectively provided at equal intervals along the circumferential direction of the valve body 5. In addition, the first protrusions 52A and the second protrusions 52B are provided apart from each other in the axial direction. Accordingly, the posture of the valve body 5 in the valve body housing 43 is able to be maintained, and therefore, the valve body 5 is able to stably move in the valve body housing 43.

In particular, in the configuration shown in FIG. 3, the first protrusion 52A and the second protrusion 52B are respectively provided at both ends of the valve body 5 in the axial direction, and the first protrusion 52A is configured to move in a region closer to the one side in the axial direction than the second port 422 (third axis O3). Thus, the above effect is further improved, and it is possible to more accurately open and close the first port 412.

In the present embodiment, the first protrusion 52A is configured to move between the first port 412 (second axis O2) and the second port 422 (third axis O3), and a sufficient stroke of the valve body 5 is able to be secured. Therefore, when the first port 412 is open (when the solenoid 2 is not operating), the size of the space inside the valve body housing 43 allowing the blow-by gas Q to pass therethrough is sufficiently increased and smooth passage of the blow-by gas Q is made possible.

Furthermore, since the first port 412 is located closer to the one side in the axial direction than the second axis O2 (central axis of the first flow path 41), a larger stroke of the valve body 5 is able to be secured, and therefore, the above effect is able to be further improved.

As shown in FIG. 4, a width W52 of each protrusion 52 along the circumferential direction of the valve body 5 gently decreases (that is, gradually decreases) radially outward. Accordingly, sliding area of each protrusion 52 with respect to the inner wall surface 431 of the valve body housing 43 is able to be reduced as much as possible while strength of each protrusion 52 during movement of the valve body 5 is maintained.

In addition, as described above, the cross-sectional shape of the valve body housing 43 is circular or substantially circular. The top 521 of each protrusion 52 has an arc or substantially arc shape having the same curvature as the circular or substantially circular shape of the valve body housing 43. Accordingly, it is possible for the valve body 5 to smoothly slide.

In addition, when negative pressure acts on the second flow path 42 side when the first port 412 is in the open state, the blow-by gas Q is able to pass between adjacent protrusions 52 in the circumferential direction. Accordingly, the pressures on the positive side and negative side in the X axis direction with respect to the valve body 5 are canceled out by each other, and therefore, unwanted movement of the valve body 5 is able to be prevented. The term "negative pressure" herein refers to a state in which the pressure on the second flow path 42 side is lower than the pressure on the first flow path 41 side.

Although the electromagnetic valve of the disclosure has been described above with the exemplary embodiments shown in the drawings, the disclosure is not limited thereto. Each of the parts that define the electromagnetic valve may be replaced with any configuration able to exhibit the same function. In addition, any component may be added.

In addition, the electromagnetic valve of the disclosure may be a combination of any two or more configurations (features) in the above exemplary embodiments.

In addition, in the above exemplary embodiments, the electromagnetic valve 1 is mounted on the vehicle 100 including the internal combustion engine 10 such as an engine or the like for use. However, the electromagnetic valve 1 is applicable not only to the vehicle 100. In addition, the fluid whose passage and blockage are switched by the electromagnetic valve 1 is not limited to a gas (blow-by gas Q) and may be a liquid or a mixture of a gas and a liquid.

In addition, in the above exemplary embodiments, the electromagnetic valve 1 is configured so that the blow-by gas Q flows from the first flow path 41 toward the second flow path 42. However, the blow-by gas Q is also able to flow from the second flow path 42 toward the first flow path 41 depending on the use state of the electromagnetic valve 1.

The protrusion 52 of the valve body 5 may be in the shape of a ridge along the axial direction or a ring along the circumferential direction of the valve body 5.

In addition, the first port 412 is not limited to a hole (relay hole) for relay purposes having no length along the axial direction, and may be a flow path (relay flow path) having a predetermined length along the axial direction.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electromagnetic valve comprising:
   a solenoid comprising:
      a bobbin of a tubular shape comprising a through hole penetrating along an axial direction;
      a plunger inserted into the through hole and movably supported along the axial direction; and
      a coil wound around an outer periphery of the bobbin, generating a magnetic force when energized, and moving the plunger; and
   a valve mechanism comprising:
      a flow path member connected to the solenoid and comprising:
         a first flow path;
         a second flow path;
         a relay part connecting the first flow path and the second flow path; and
         a valve body housing disposed adjacent to the relay part and along the axial direction; and
      a valve body of a columnar shape, inserted into the valve body housing, movably supported along the axial direction together with the plunger, and switching between passage and blockage of a fluid via the relay part between the first flow path and the second flow path, wherein the valve body comprises:
         a protrusion provided protruding radially outward from an outer periphery of the valve body and guided by an inner wall surface of the valve body housing when the valve body moves;
         a body made of resin;
         a pin made of metal, provided at a center of the body along the axial direction and penetrating the body;
         the valve body comprises a valve part having elasticity, the valve part is located to one end side in the axial direction of the pin; and
         the plunger comprises a plunger pin made of metal, wherein
         an end surface of the pin on another side in the axial direction and an end surface of the plunger pin on one side in the axial direction are in contact with each other.

2. The electromagnetic valve according to claim 1, wherein
   the pin comprises a first diameter-reduced part where an outer diameter of the pin is reduced, wherein
   the first diameter-reduced part contacts the body and restricts movement of the body in the axial direction with respect to the pin.

3. The electromagnetic valve according to claim 2, wherein
   the pin further comprises a second diameter-reduced part where the outer diameter of the pin is reduced, wherein
   the first diameter-reduced part is located on the other side in the axial direction, and the second diameter-reduced part is located on one side in the axial direction.

4. The electromagnetic valve according to claim 3, wherein
   the second diameter-reduced part protrudes on the one side in the axial direction from the body;
   the relay part comprises a port opening to the valve body housing and connected to the first flow path;
   the valve body further comprises the valve part having elasticity, the valve being provided in contact with the second diameter-reduced part and capable of contacting a peripheral edge of the port.

5. The electromagnetic valve according to claim 1, wherein the flow path member is made of resin.

6. The electromagnetic valve according to claim 1, wherein the body and the pin are integrally formed by insert molding.

7. The electromagnetic valve according to claim 1, wherein
   the body comprises a recess provided on a surface on the other side in the axial direction and recessed toward one side in the axial direction, and an end surface of the pin on the other side in the axial direction is exposed on a bottom surface of the recess.

8. The electromagnetic valve according to claim 1, wherein
   the valve mechanism comprises a coil spring provided on the other side in the axial direction with respect to the valve body and pushing the valve body toward the other side in the axial direction, wherein
   the protrusion functions as a spring seat contacted by an end of the coil spring on the other side in the axial direction.

* * * * *